United States Patent [15] 3,667,364
Mann [45] June 6, 1972

[54] CAMERA INCLUDING SEQUENTIAL EXPOSURE APPARATUS FOR A FILM PLATE

[72] Inventor: Arthur S. Mann, 1790 S. W. 23rd Avenue, Miami, Fla. 33145

[22] Filed: Dec. 12, 1969

[21] Appl. No.: 884,682

[52] U.S. Cl. .................................. 95/37, 95/1.1, 355/53
[51] Int. Cl. ............................................... G03b 17/32
[58] Field of Search .................. 95/37, 1.1, 31 X, 36, 82; 33/1 M; 355/86

[56] References Cited

UNITED STATES PATENTS

| | | | |
|---|---|---|---|
| 1,307,325 | 6/1919 | Taylor | 355/86 |
| 1,465,283 | 8/1923 | Ogden | 355/86 |
| 3,495,519 | 2/1970 | Alfsen et al. | 31/1 M X |
| 766,967 | 8/1904 | Newman | 95/37 |
| 2,172,283 | 9/1939 | Kirby et al. | 95/37 |
| 492,025 | 2/1893 | Klay | 95/37 |
| 872,871 | 12/1907 | Wayland | 95/37 |
| 2,394,225 | 2/1946 | Ashford | 95/1.1 X |
| 3,223,007 | 12/1965 | Craven et al. | 95/31 X |
| 745,688 | 12/1903 | Swartz | 95/37 |

OTHER PUBLICATIONS

" X-Y Alignment tables with stationary drives," Bresg & Koste, IBM Technical Disclosure Bulletin, Vol. 10, No. 6, page 800.

Primary Examiner—Samuel S. Matthews
Assistant Examiner—Russell E. Adams, Jr.
Attorney—Keith Misegades and George R. Douglas, Jr.

[57] ABSTRACT

A camera including a fixed lens and aperture and means for sequentially moving a film plate past the lens sight line to present predetermined areas of the film plate for exposure each time the lens shutter is actuated. A secondary, simultaneous exposure system photographs and transmits identifying data, such as a number, to the predetermined film plate area. A rack and pinion assembly moves the film plate to selected positions for exposure of an area of the film plate and includes a numbered and lettered reference guide system. A pencil light beam apparatus allows proper alignment of the camera lens with the subject. Micrometer adjustment means are provided for the rack and pinion assembly. A master control switch is located in the secondary exposure system which prevents activation of the entire camera unless the identifying data is properly positioned.

13 Claims, 18 Drawing Figures

PATENTED JUN 6 1972

INVENTOR.
ARTHUR S. MANN
BY Misegades & Douglas
Keith Misegades
ATTORNEYS

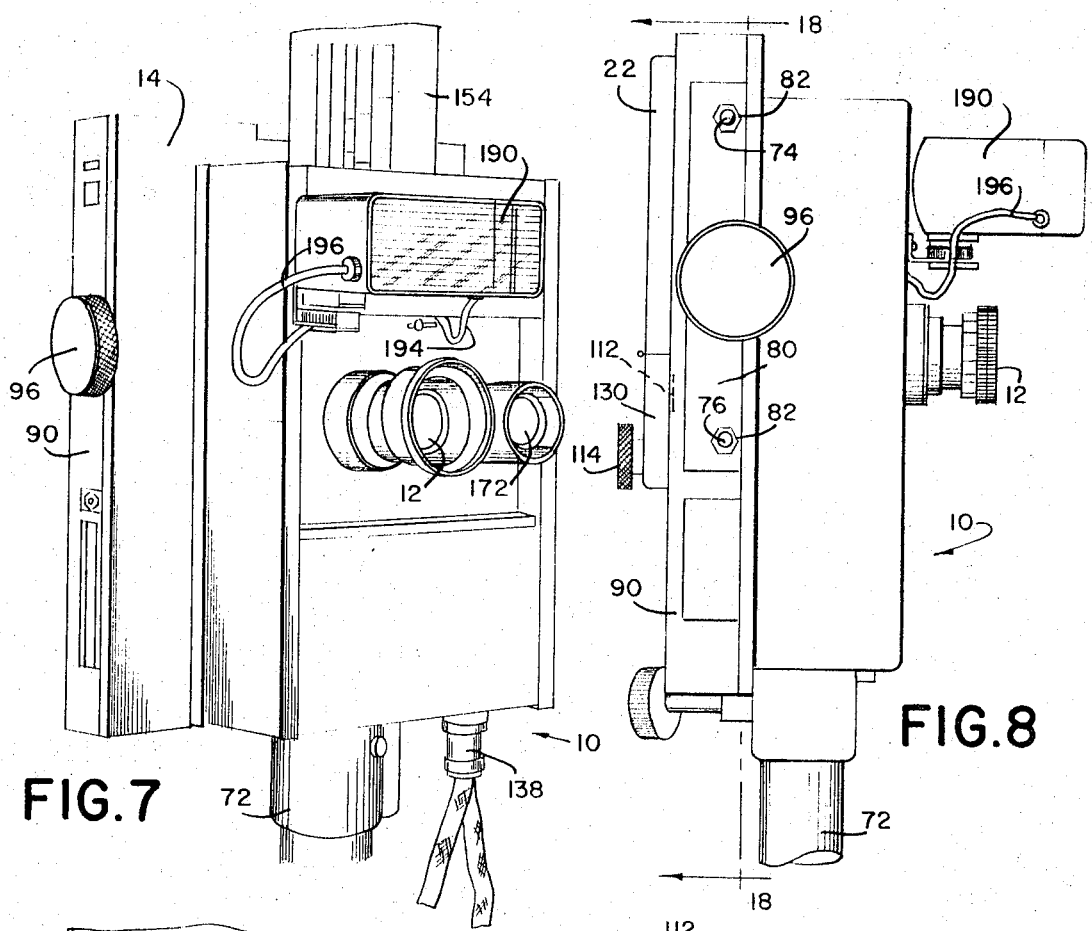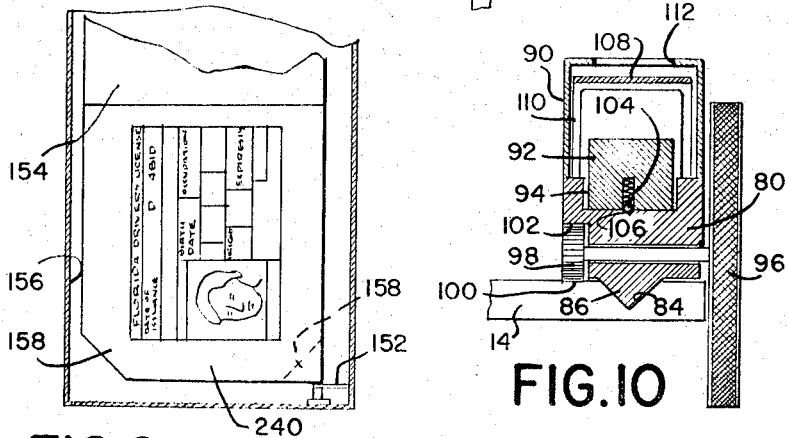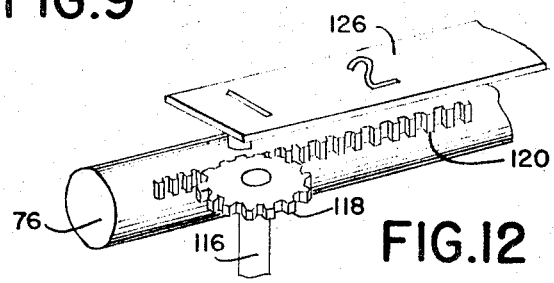

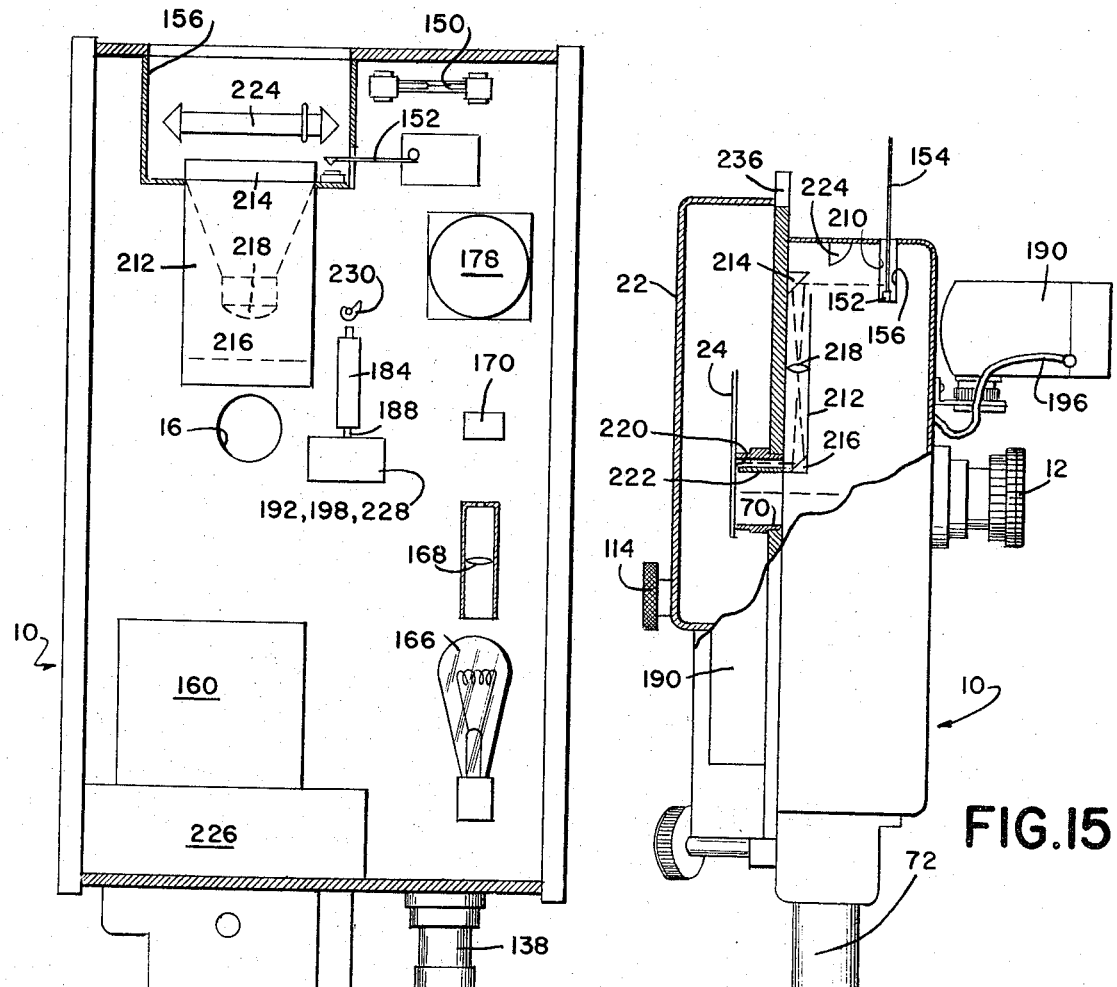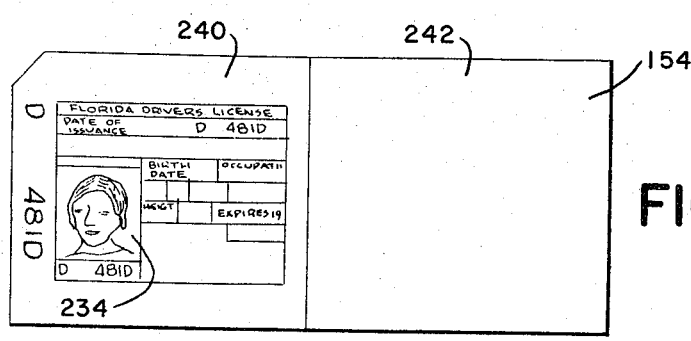

CAMERA INCLUDING SEQUENTIAL EXPOSURE APPARATUS FOR A FILM PLATE

BACKGROUND OF THE INVENTION

The invention relates generally to the art of photography and specifically to a camera arranged to sequentially expose predetermined areas of a single film plate by movement only of the film plate; the primary lens and lens aperture remain stationary, directed toward the subject matter to be photographed. Such photographic apparatus has many useful applications, a most significant one being photoidentification of a large number of persons. Specifically, recent new statutes in a number of states now require a photograph of the licensee to appear on the license issued by the state. This is particularly true in the field of vehicle operators' licenses. Additionally, many large plants and federal and military reservations and complexes issue identification tags to personnel which must include a photograph of the bearer. Therefore, it is the general object of the present invention to provide an extremely simple, and therefore economical photoidentification system and apparatus for implementing that system.

The camera apparatus which is the subject of the instant invention provides an apparatus that will produce a number of individual photographs on a single sheet of exposed film. This is advantageous for two principal reasons. First, a rather obvious financial saving in the cost of film is provided. Secondly, a standard sized, rather large sheet of film may be subdivided into a number of smaller, individual photographs, which may be of a predetermined size to fit precisely in the space provided on the ultimate identifying tag or license. For example, a standard Polacolor 75 speed, type 108 film pack, marketed by the Polaroid Corporation comprises a cartridge containing eight self-developing, negative-positive color film assemblies. The resultant positive measures 4¼ inches by 3⅜ inches in overall dimensions, and includes an effective exposed area of 3¾ inches by 2⅞ inches; the finished product has a blank border one-fourth inch wide. Conveniently, this effective exposed area may be subdivided by a factor of 9 to yield nine individual photographs, each measuring 1¼ inches by twenty-three/twenty-fourths of an inch. Some minute spacing may be desirable, thus reducing each picture to 1 3/16 inches by fifteen-sixteenths inch. Such a size picture is large enough for identifying purposes and yet small enough to fit upon an identifying tag or license of the wallet-sized variety.

The invention further provides a secondary exposure system for photographing identifying indicia at the base of each individual photograph. For the specific embodiment described above, the strip for the indicia would be five thirty-seconds inch in height, and have a length corresponding to the width of the individual photograph.

With the exception of one prior U. S. patent, which will be discussed below, the development of the art of multiple exposures on a single film plate has taken the routes of providing a mask for the film plate, or multiple lenses for exposing different areas of the film plate. The present invention provides an apparatus for sequentially moving a film plate past the axis or line of sight of a stationary camera lens.

U.S. Pat. No. 686,001, issued to Gilbert J. Miller, discloses a film plate structure employing a plurality of masks to successively exposed predetermined portions of the entire film plate; the patent indicates one line of development in the art. The major problem encountered in this structure is that, since the camera lens remains stationary, the angle of image projection varies from partial exposed area to partial exposed area, thus contributing a lack of uniform exposure between the multiple partial negatives and resultant positive prints. U.S. Pat. Nos. 1,936,512, issued to John C. Hunter; 3,124,050, issued to Harry Bay; and 3,318,218, issued to William G. Yax, are variations on the theme presented in the Miller patent.

The use of multiple lenses is disclosed in U.S. Pat. No. 3,069,987, issued to William F. Harrington. The deficiencies are obvious; the added expense of multiple lenses is required, and the line of sight varies from lens to lens, thus introducing an irregularity of exposure between multiple finished products.

The concept of moving a film plate behind a stationary lens per se is not novel, but progress in this third lie of development in the art of multiple exposure of a single film plate has been rather limited. U.S. Pat. No. 2,386,276, issued to C. G. Simjian discloses such a camera structure, but two semi-independently moveable, apertured support members are required for the film plate (FIG. 5). The rack and pinion system used to move the single film plate to various exposure positions can only operate in a single, predetermined path. Instantaneous movement to any one of the various exposure positions without backtracking through several other positions is not possible. The spur gear 64 used in the system has a natural tendency to lock or bind when passing from one gear rack to another, disposed at a ninety degree angle to the first. A number plate system for individual photo identification is shown, but only a single lens and mirror are used to reflect the number on the film negative (FIG. 4). Thus, the original number on card 32 (FIG. 4) must be in mirror image. The instant invention overcomes these deficiencies as well as adds several items which greatly enhance the operation of such a device.

SUMMARY OF THE INVENTION

The heart of the invention is improvements in a camera having a fixed lens and aperture, and means for sequentially moving a film plate past the lens sight line, which improvements include: a secondary, simultaneous exposure system for correctly transmitting indicia to the film plate; independently movable, horizontal and vertical spur gear and rack assemblies for moving the film plate, which may include a reference number and letter guide, indicating the various positions of the film plate; a pencil light beam system for proper alignment of the camera with the subject; micrometer adjustment means for the gear and rack assembly; a master control switch for the camera, activated by presence of an identifying card; and an electrical control system, which prevents double exposure of any single area of the film plate.

BRIEF DESCRIPTION OF THE DRAWINGS

Details of construction and operation according to preferred embodiments of the invention will become apparent by reference to the following drawings, wherein:

FIG. 7 is an elevational view, in perspective, of the preferred, sophisticated embodiment of the invention;

FIG. 8 is a side view of the invention as shown in FIG. 7;

FIG. 9 is an enlarged, detail view of the master control switch for the preferred embodiment of the invention;

FIGS. 10 and 11 are partial, sectional views through the vertical and horizontal guide means respectively, of the preferred embodiment of the invention;

FIG. 12 is a partial, perspective view of the horizontal guide means as shown in FIG. 11;

FIG. 15 is a view similar to FIG. 8 but with parts broken away to show internal detail;

FIG. 16 is a plan view of a card which may be used to activate the master control switch illustrated in FIG. 9;

FIG. 17 is an internal, elevational diagrammatic view of the preferred embodiment of the invention, showing electrical parts of the invention without wiring.

DESCRIPTION OF THE PREFERRED EMBODIMENTS

Figure 1:
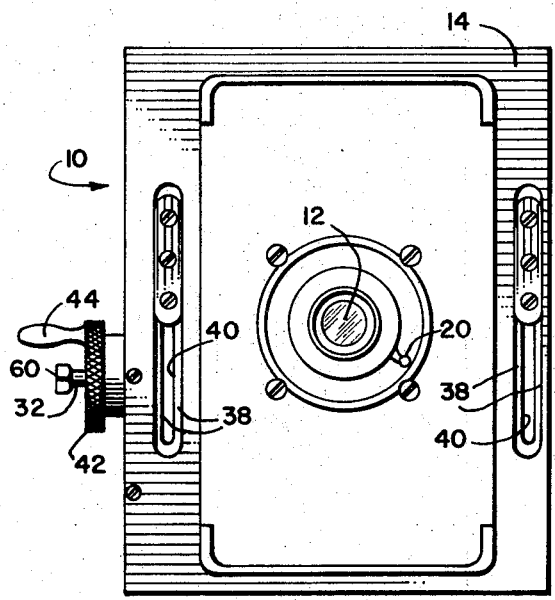
FIG. 1 is a front, elevational view of one embodiment of the invention.

Referring now to the drawings by reference character, and in particular to FIGS. 1 through 6 thereof, a simple camera 10 is shown, which includes a lens 12, and a back support plate 14 through which a lens aperture 16 is formed, concentric with respect to the line of sight 18 of lens 12. A mechanical shutter is indicated at 20, which may be hand operated, or automatically tripped by any of a variety of shutter trips presently commercially available (not shown).

On the rear of the camera (FIG. 2) is a film pack or chamber 22 which contains at least a film plate or negative 24. Preferably, the film pack 22 contains self-developing film comprising negative and positive sheets, drawn together after exposure of the negative for development of the positive by simultaneously collapsing a cell of gelatinous developer and spreading the same between the negative and positive sheets (not shown). Per se, the film pack employed forms no part of the instant invention.

Figure 4:
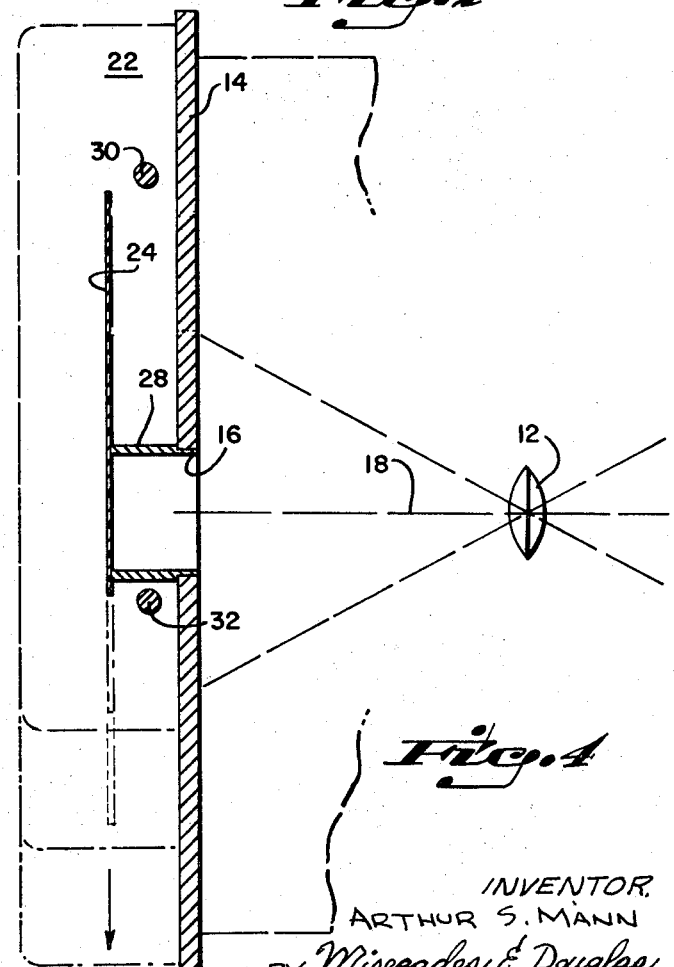
FIGS. 4 and 5 are partial, diagrammatic sectional views taken along lines 4—4 and 5—5, respectively of FIG. 2, and drawn to an enlarged scale.
Figure 5:
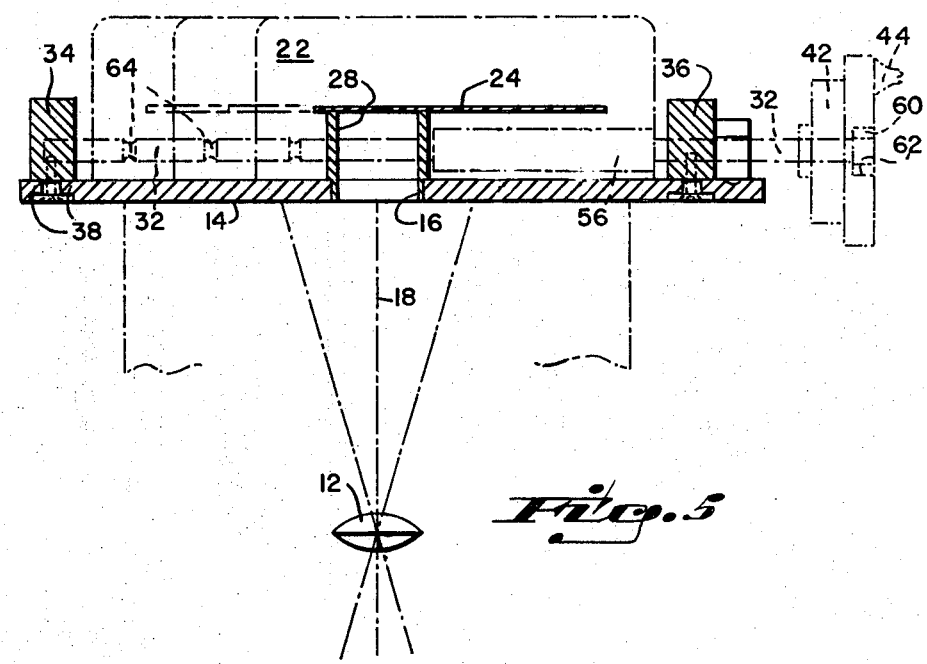
Figure 6:
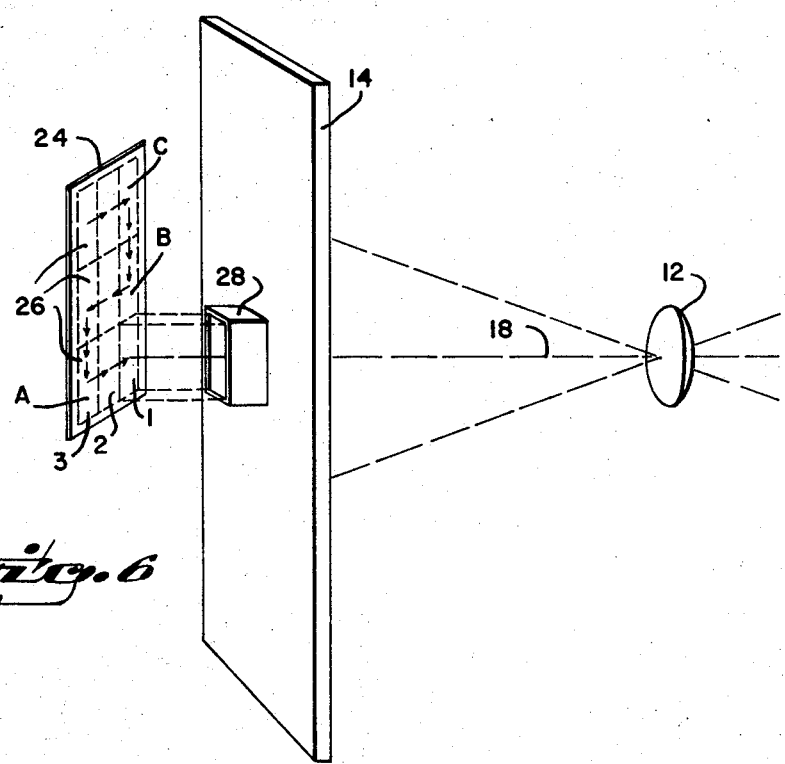
FIG. 6 is a perspective, diagrammatic view, illustrating the line of sight of the primary lens and sequential movement of the film plate past the line of sight.

The primary function of the invention is to present the film plate 24 in a number of predetermined positions behind stationary lens 12, aperture 16, and line of sight 18 of lens 12. As shown in FIG. 6, in a preferred embodiment of the invention, plate 24 will be divided into nine exposure areas 26, and the sequence of exposing plate 24 will be in reverse "S" fashion, as shown by the arrows, starting at the upper left hand corner of plate 24 and terminating at the lower right hand corner thereof. Obviously, camera 10 may be designed to accommodate any number of exposures of plate 24. Presently, nine exposures are quite practical. FIGS. 4 and 5 illustrate this sequential movement of plate 24, vertically and horizontally, respectively. An aperture box 28, which is fitted within aperture 16 in a light seal relationship, terminates at its other end closely adjacent plate 24 to prevent stray light from an exposure from filtering out over other areas of plate 24.

The structure for moving film chamber 22 with plate 24 to the various exposure positions basically comprises a pair of transverse rods 30, 32, and a pair of vertical bearing members 34, 36, each slotted along their lower, longitudinal side edges to interfit with rails 38, 38, formed in slots 40, 40, which guide members 34, 36 for vertical movement. Of course, bearing members 34, 36 support rods 30, 32, which carry film chamber 22 and plate 24; thus, movement of members 34, 36 causes vertical movement of plate 24.

Figure 2:
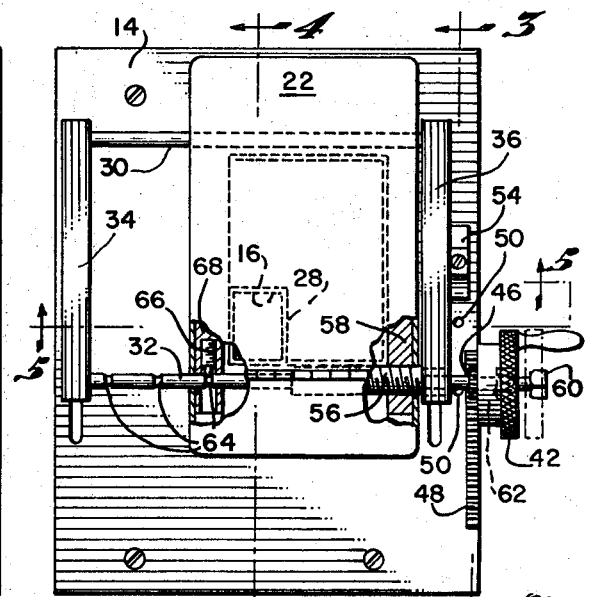
FIG. 2 is a rear, elevational view of the invention as shown in FIG. 1, with parts broken away to show interior detail.
Figure 3:
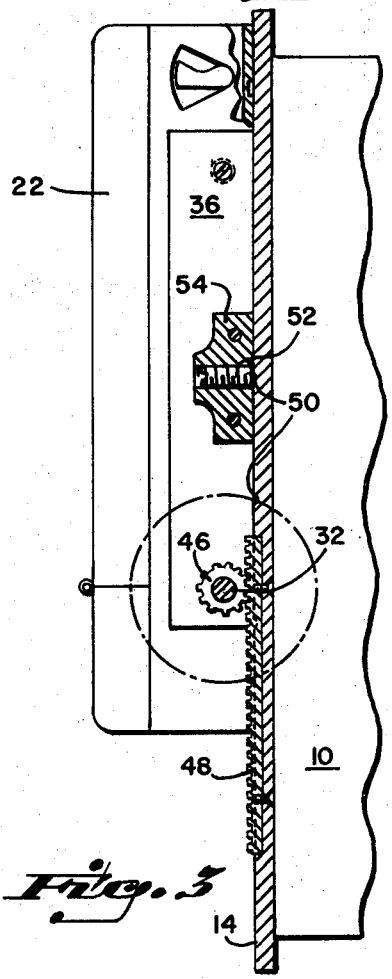
FIG. 3 is a partial, sectional view, taken along lines 3—3 of FIG. 2, and drawn to an enlarged scale.

A control wheel 42, having a handle 44 on one face and a spur gear 46 formed on its opposite face controls vertical movement of plate 24. Spur gear 46 meshes with a gear rack 48 formed on the rear face of back plate 14, adjacent spur gear 46 (FIG. 2). Wheel or knob 42 is centrally bored to receive the distal end of rod 32, and is freely rotatable with respect thereto, and slidable therealong, for reasons to be explained presently. With spur gear 46 in mesh with rack 48 (FIG. 2), rotation of wheel 42 causes bearing members 34, 36 to move vertically.

As shown in FIG. 4, film chamber 22 and film plate 24 may be disposed successively in one of three vertical settings, to correspond to the three horizontal rows of three exposure areas 26 each, illustrated in FIG. 6. These three vertical positions are defined by stop means including three vertically spaced detents 50, 50, 50, formed on the rear face of back plate 14 (FIGS. 2 and 3), which cooperate with a spring loaded ball 52, mounted within a block 54, attached to a side of bearing member 34. As the film plate 24 is moved vertically by rotation of wheel 42, the ball 52 will snap sharply into place within a detent 50 when one of the proper vertical settings for film chamber 22 is reached. For example, FIGS. 2 and 3 indicate the film chamber 22 in an uppermost position, with ball 52 within uppermost detent 50; thus film plate 24 is properly vertically disposed for exposure of any one of the top three areas 26 illustrated in FIG. 6.

Horizontal movement of film chamber 22 and film plate 12 to any one of three horizontal settings, to correspond to the three vertical rows of three exposure areas 26 each, illustrated in FIG. 6, occurs by moving film chamber 22, laterally along rods 30, 32. Control rod 32 includes screw thread 56, threaded through a side wall 58 of film chamber 22 (FIG. 2). Thus, rotation of rod 32 causes film chamber 22 to move laterally with respect to back plate 14. The distal end of rod 32 includes an hexagonal nut or lug 60, formed or threaded thereon, which is adapted to fit a mating hexagonal recess 62, formed centrally within the outer face of control wheel 42 (FIG. 2). To rotate rod 32, control wheel 42, which slides freely on rod 32 as explained above, is slid outwardly to mate nut 60 and recess 62. Simultaneously, spur gear 46 is disengaged from gear rack 48 so that vertical movement of film chamber 22 is prevented. Rotation of wheel 42 will now cause rod 32 to rotate, and move film chamber 22 and film plate 24 horizontally. The position of wheel 42 for horizontal movement of film plate 24 is indicated by dot and dash lines in FIGS. 2 and 5.

Three horizontal settings for film chamber 22 are defined by stop means including three circumferential detents 64, 64, 64, which cooperate with a second spring loaded ball 66 mounted within side wall 68 of film chamber 22. As film chamber 22 moves horizontally, ball 66 will snap into a detent 64 when a proper horizontal position for film chamber 22 has been reached (FIG. 2).

To operate the invention as illustrated in FIG. 6, wheel 42 is rotated counter clockwise, with spur gear 46 in mesh with rack 48 until lowermost detent 50 is engaged with ball 52. Wheel 42 is then pulled outwardly, to engage nut 60 in recess 62, and rotated counterclockwise (FIG. 2) until ball 66 drops into the far left hand circumferential detent 64, in the sense of FIG. 2. This will move film chamber 22 and film plate 24 so that the upper left hand exposure area 26 is positioned directly behind lens 12. Of course, film plate 24 may be horizontally moved initially, and then vertically, as the controls for each movement are independently actuable. After the first exposure is taken, wheel 42 with nut 60 engaged in recess 62 may be rotated clockwise until ball 66 drops into the middle detent 64, thus presenting the upper middle exposure area 26 of FIG. 6 in proper position. Further clockwise rotation of wheel 42 will bring ball 66 to the right hand detent 64 (FIG. 2) so that the uppermost right hand area 26 of FIG. 6 will be ready for exposure.

The middle row of exposure areas 26 is reached by pushing in on wheel 42, thereby disengaging nut 60 and recess 62 and enmeshing spur gear 46 and rack 48, and rotating wheel 42 clockwise until ball 52 drops into middle detent 50. With recess 62 of wheel 42 reengaged with nut 60, wheel 42 may be rotated counterclockwise (FIG. 2) to align, successively, the remaining two middle exposure areas 26 behind lens 12. The bottom row is reached by dropping film plate 24 so that ball 52 engages uppermost detent 50.

Obviously, the sequence of exposure for each area 26 is relatively unimportant. Any sequence desired may be followed in that the means for vertically and horizontally moving the film plate 24 are independently actuable. For example, one may wish to follow an "S" pattern of exposure rather than the reverse "S" pattern illustrated in FIG. 6, or use the vertical rows sequentially, rather than the horizontal rows. Furthermore, practice has shown that once an entire film plate 24 is exposed, it is easier to remove the same from the camera by placing the film chamber 22 in an uppermost, middle position. The vertical and horizontal film chamber moving means, being independently actuable, may be operated in any shorthand method to reach this desired position.

Figure 13:
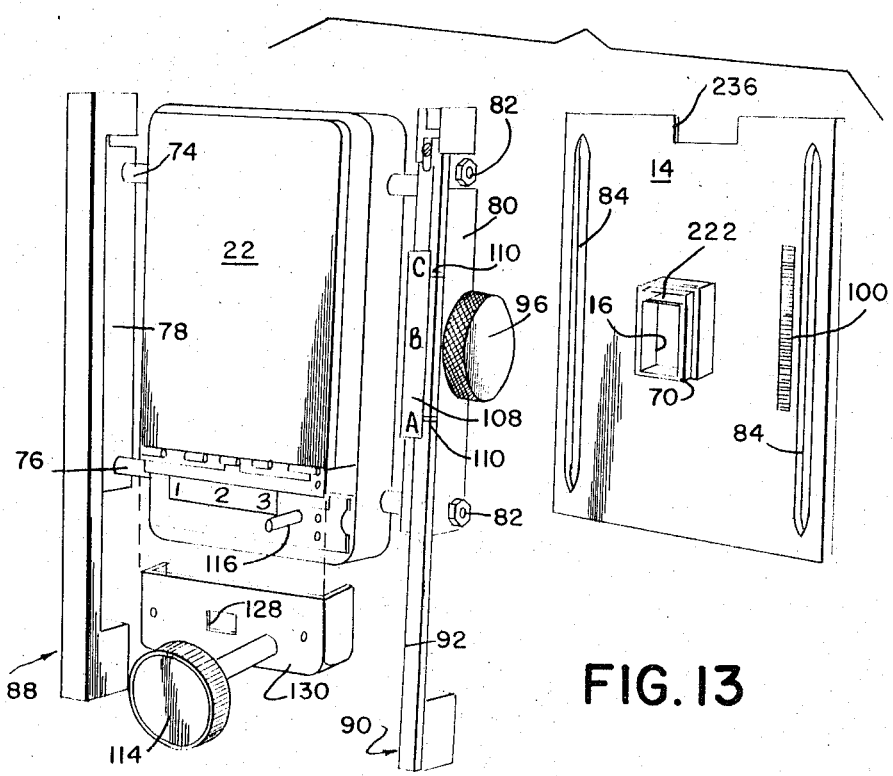
FIG. 13 is a perspective, exploded view of the back of the preferred embodiment of the invention.

Turning now to FIGS. 7 through 17, a more sophisticated embodiment of the invention will be discussed. However, this second embodiment still retains the essential operative features of the first embodiment just discussed. Again, camera 10 includes lens 12, back plate 14, aperture 16 formed in plate 14 (FIGS. 13 and 15), a shutter (not shown), film chamber or pack 22, film plate or negative 24 (FIG. 15) and an aperture box 70, somewhat similar to aperture box 28 (FIGS. 13 and 15).

A tripod stand, partially illustrated in the drawings at 72, provides a stationary support for camera 10. As in the first embodiment, camera 10, lens 12, and back plate 14 are all stationary during the exposure process; only film pack 22 with plate 24 are moved about, sequentially, behind the lens. This embodiment is preferably arranged to divide film plate 24 into nine exposure areas as in the first embodiment. Therefore, FIG. 6 is applicable to both embodiments and need not be discussed further.

Figure 18:
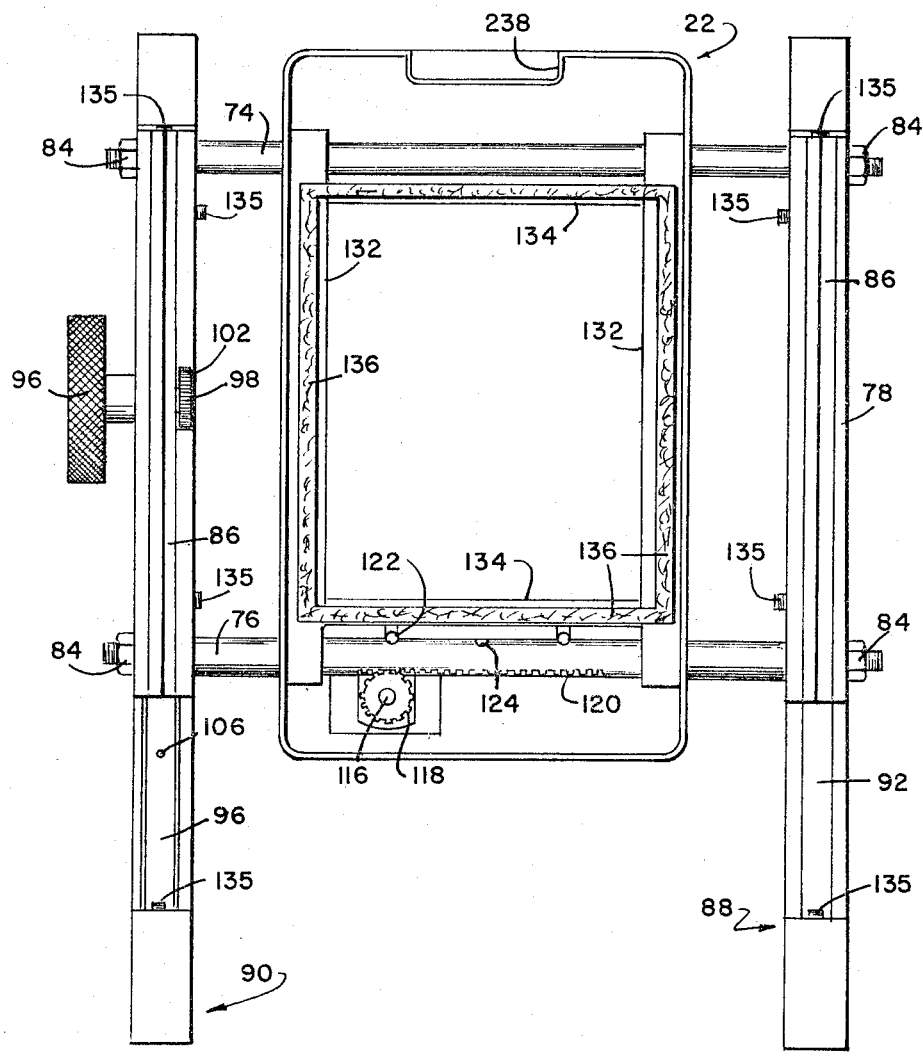
FIG. 18 is a sectional view, taken along lines 18—18 of FIG. 8.

As in the first embodiment, the means for moving the film pack 22 vertically are independently operable of the means for moving the film pack horizontally, but here there is absolutely no mechanical interconnection between the two means. Film pack 22 is supported by rods 74 and 76, each of which is journaled through bearing members 78 and 80, and secured thereto by suitable means, such as hex nuts 82, 82, 82, 82. A pair of grooves 84, 84 (FIG. 13) are formed in the rear face of back plate 14 to guide bearing members 78, 80, vertically and each includes a V-shaped shoe 86, mating in cross-section with grooves 84, (FIGS. 10, 13 and 18). Bearing members 78 and 80 are retained in place by a pair of retaining bridges 88, 90, each of which includes a stationary retaining rail 92 which rides within a channel 94, formed within the upper, longitudinal face of bearing member 78, 80, opposite shoe 86 (FIG. 10). Bearing members 78, 80 are moved vertically by means including a hand controlled knob 96, journalled through bearing member 80, and terminating in a spur gear 98, which meshes with a gear rack 100, formed adjacent one groove 84 (FIGS. 10 and 18). Thus in the sense of FIG. 13, clockwise rotation of knob 96 moves film pack 22 upwardly while counterclockwise rotation of knob 96 moves film pack 22 downwardly. It will be noted that, unlike the first embodiment, gear rack 100 and spur gear 98 are always in mesh.

The three vertical settings for the three horizontal rows of exposure areas 26 shown in FIG. 6 are defined by stop means including a pair of spring loaded balls 104, one of which is illustrated in FIG. 10, mounted in rail 92, and a set of five equispaced detents 106, formed in bearing member 80, one of which is shown in FIG. 18. The use of a pair of balls 104 assures a more secure locking of film pack 22 in each of the vertical settings. Since each vertical setting is equispaced, only five detents are needed. The central detent is occupied by the lower spring loaded ball 104 when film pack 22 is in an uppermost attitude, and the same detent is occupied by the upper spring loaded ball 104 when film pack 22 is in a lowermost attitude. Visual reference for a quick check as to which horizontal row is being exposed is provided by a lettered plate 108, secured over rail 92 by a pair of inversely shaped arbors 110, mounted in bearing member 80 (FIG. 10). An aperture 112 is formed in the top face of bridge 90 (FIG. 8) for visual access to plate 108 and the indicia thereon. Referring to FIGS. 6 and 13 by way of example, the bottom row of exposure areas 26 may be row A, the next row B, and the top row referred to as C. Since aperture 112 is stationary, the letter A on plate 108 will appear when film pack 22 is in the position shown in FIGS. 8, 13 and 15. When knob 96 is rotated counterclockwise, the letter B for the middle row will next appear in aperture 112, and finally letter C, for the top row of exposure areas.

Referring now to FIGS. 11, 12, 13 and 18, means independent of the vertical film pack 22 moving means are illustrated which provide for lateral or horizontal movement of film pack 22. A second knob 114 (FIG. 8) is attached to a shaft 116, journalled through film pack 22 and terminating in a spur gear 118 which meshes with a gear rack 120 formed on the lower face of rod 76. In the sense of FIG. 13, rotation of knob 114, and thus shaft 116, in a clockwise fashion causes movement of film pack 22 in a left hand direction, and rotation of shaft 116 counterclockwise causes a right movement of film pack 22. FIG. 18 indicates stop means, comprising a pair of spring loaded balls 122 cooperating with two of five detents 124 formed in the upper surface of rod 76. Balls 122 and detents 124 cooperate in the same fashion as balls 104 and detents 106, in defining three horizontal settings for film pack 22. The three vertical rows of exposure areas 26 (FIG. 6) may be numbered 1, 2 and 3, and an indicia plate 126, similar to plate 108, is mounted on rod 76 (FIG. 11) for visual reference, with the numbers 1, 2 and 3 appearing thereon (FIG. 13). As film pack 22 is moved left or right, a number identifying the vertical row will appear in window 128 of lower cover 130 of film pack 22, since plate 126 is stationary, being affixed to rod 76, and window 128 moves with film pack 22. Thus, in this embodiment of the invention, the exposure sequence is designed as the reverse of the arrows appearing on film plate 12 in FIG. 6. That is, "A" row, areas 1, 2 and 3 will be exposed first, then the "B" row, areas 3, 2 and 1, and finally the "C" row, areas 1, 2 and 3. As in the case of the first embodiment, any sequence imaginable may be employed in exposing areas 26 because the means for vertically and horizontally moving film pack 22 are independently operable.

Referring to FIG. 18, film pack 22 is supported by a pair of side walls 132, 132, through which rods 74 and 76 are journalled in a light seal relationship, and base members 134, 134 disposed between walls 132, 132, interiorally of rods 74, 76. A felt or fabric liner 136 is applied to those portions of walls 132, 132 and bases 134, 134 that are adjacent the rear face of back plate 14 (FIG. 13) to prevent the entry of ambient light into film pack 22 as it moves from exposure position to exposure position. As in the first embodiment of the invention, the rearwardly extending side walls of aperture box 70 also extend to a position just short of face to face contact with film plate 12 (FIG. 15) to prevent ambient light from one exposure from interfering with any adjacent exposure area on film plate 12. As shown in FIG. 18, spring loaded balls 122 are mounted in the bottom of lower base 134. If desired, a plurality of allenhead adjusting screws 135 may be mounted in bearing members 78, 80 and bridges 88, 90, as shown in FIG. 18, for micrometer adjustment of the limits of horizontal and vertical movement, respectively, of film pack 22 so that a minimum of waste space appears between adjacent exposure areas 26 of film plate 24.

The shutter mechanism employed with lens 12 is a standard mechanical shutter (not shown) and, by itself, forms no part of the instant invention. However, a unique actuation system for the shutter is provided, the electrical diagram thereof being shown in FIG. 14, and the physical parts thereof being illustrated best by FIGS. 7 and 17. A standard 4-way plug 138 includes two lines 140, 142 for a power source, such as standard household current of 110 volts, 60 cycles, A.C., and two lines 144, 146, leading to a push button control 148. A fuse 150 may be provided in line 140. Line 140 leads to a leaf spring micro switch 152, also illustrated in FIG. 9. The purpose of switch 152 is to serve as a master control; unless depressed, the camera will not function. Switch 152 is activated by insertion of an item or card 154 into a well 156 formed within the upper forward area of camera 10. In the desired embodiment of the invention, card 154 (FIG. 16) comprises a standard computer punchcard, with a corner clipped as at 158. For reasons to be discussed below, it is desirable that the card be inserted with corner 158 to the left, as shown in FIG. 9. Thus, switch 152 is arranged so that it can be activated only when the card is so inserted. If the card is inserted in reverse, with corner 158 to the right, as indicated by dot and dash lines (FIG. 9), the spring leaf of switch 152 will not be depressed to close the contacts of switch 152.

The closing of switch 152 energizes a transformer 160 through line 162, the circuit being completed through line 164 to the other power line 142. In turn, transformer 160 energizes a light 166, which, through condensing lens 168, mirror 170 (FIG. 17) and lens 172 (FIG. 7) creates a pencil beam of light which is directed to the subject to be photographed in order to properly align camera lens 12. Of course, transformer 160 is not a necessity. A conveniently small, 110 volt A.C. bulb may be used in place of transformer 160 and light 166.

The closing of switch 152 completes a circuit, broken only by pushbutton contact 148, which includes lines 144 and 146, swinging contact 176 of relay 178, normally against contact 180 which is wired to line 182, solenoid coil 184, and return line 164 to line 142. A normally open manual override switch 186 is inserted between lines 140 and 144 if the effect of card switch 152 is to be negated. Core 188 of solenoid 184 is mechanically connected to the shutter of camera 10 (not shown) and trips the same through completion of the circuit just described, by the closing of button 148. At the same time, an external illuminating means, such as a strobe light 190, is energized by the closing of trigger switch 192, which is also tripped by movement of core 188. Light 190 is independently wired for power by line 194 (FIG. 7). Line 196 for strobe light 190 is wired to trigger switch 192 (FIG. 7). Yet another trigger switch 198 completes a circuit for energizing relay 178, and is also closed upon movement of core 188. The circuit for energizing relay 178 includes line 140, card switch 152 and line 162, or override switch 186 and line 144 to line 162 if the card switch 152 is not used, relay circuit line 200, relay trigger switch 198, relay line 202, which leads to one terminal of relay 178, and return line 204, from the other terminal of relay 178 to power line 142. Energization of relay 178 swings contact 176 away from contact 180, thus breaking the circuit for solenoid 184 and allowing the shutter (not shown) to close, and brings contact 176 against a contact 206, wired to line 202. This reestablishes a holding circuit for relay 178, since the initial energization circuit therefor was broken by the opening of trigger switch 198, upon upward movement of core 188, caused by deenergization of solenoid core 184. This secondary holding circuit for relay 178 includes line 140 to line 144, through card switch 152 or override switch 186, depending on which is used, pushbutton 148, line 146, contacts 176 and 206, to line 208, line 202 and one terminal of relay 178, and return line 204 from the other terminal of relay 178 to power line 142. It is apparent that as long as pushbutton 148 remains depressed, accidental secondary tripping of the shutter (not shown) from movement of core 188 cannot occur, since the circuit for solenoid 184 remains broken by the break between contacts 176 and 180, caused by energization of solenoid 178. Once pushbutton 148 is released, the energizing circuit for relay 178 is broken, contact 176 swings against contact 180, and the system is ready again for another exposure.

As mentioned above, this preferred embodiment of the invention includes a secondary exposure system for each exposure area 26 which transfers identifying indicia to area 26. FIGS. 16 and 17 best illustrate this feature of the invention. An identifying number of letter and number combination is printed on the base of card 154 (FIGS. 9 and 16) which is photographed on exposure area 26 at the same time camera lens 12 is opened to take a picture. The image passes from card 154 through an aperture 210 in card well 156 to a periscope 212, which includes mirrors 214 and 216, and central lens 218, and from periscope 212 to area 220 of exposure area 26 through secondary aperture box 222 of box 70 (FIGS. 13 and 15). It will be noted that, with the provision of two mirrors 214 and 216, and periscope lens 218, the positive image appearing on card 154 will be inverted and reversed to a mirror image on film plate 24, as will the subject being photographed through camera lens 12. Thus both images are properly aligned on film plate 24 for production of the usual positive print therefrom.

The reason for card switch 152, and its location with respect to corner 158 of card 154 is now clear (FIG. 9). Switch 152 may be depressed only when the identifying number on card 154 is properly located to be photographed on area 220. If the card number is not properly aligned, corner 158 will be over switch 152, switch 152 will not be depressed, and a picture cannot be taken.

A secondary strobe light or light source 224 provides illumination for the identifying number area of card 154. As in the case of external strobe light 190, strobe 224 includes an independent power source 226 (FIG. 17) and a trigger switch 228, tripped by downward movement of core 188, as in the case of trigger switch 192 for external strobe 190.

Figure 14:
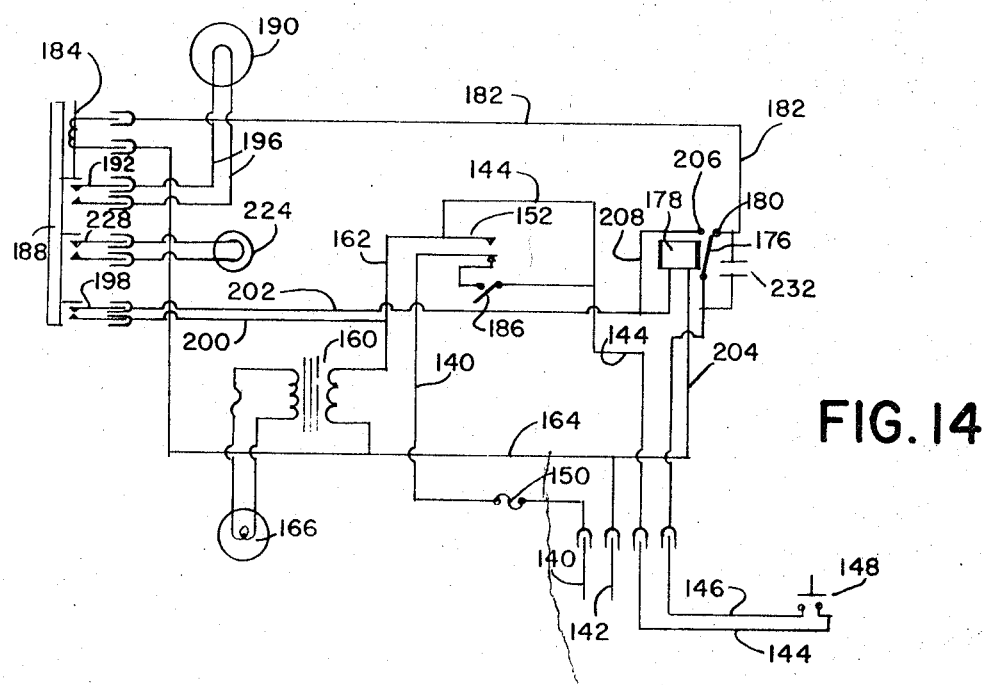
FIG. 14 is a wiring diagram for the preferred embodiment of the invention.

A manual shutter lock 230 may also be provided for locking the mechanical shutter (not shown) in an open position when it is necessary to check the focus of camera lens 12 on the subject. As illustrated in FIG. 14, a capacitor 232 may be wired from swinging contact 176 to line 182 to prevent arcing in the contact points of relay 178.

The simplicity of the invention enhances its character of being a complete, portable, and self contained photo identification system. All that is needed is a power source, a chair for the subject and a curtain backdrop for the chair to complete the system (not shown). FIG. 16 indicates a punchcard that may be configured to easily produce a driver's license with a photograph of the licensee appearing thereon. FIG. 16 illustrates the completed card, subsequent to the placement of the identifying photograph 234, a positive print taken from film plate exposure area 26. An individual card 154 is used for each licensee. When card 154 is inserted into well 156, a photograph of the subject is taken. When nine such exposures have been taken, film pack 22 may be moved to an uppermost middle position with respect to back plate 14 (FIG. 13) so that film plate 24 together with a positive (not shown) may be withdrawn from film pack 22, when a self-developing film pack 22 is employed. Recess 236 (FIG. 13) cut into the top edge of back plate 14 cooperates with a finger indent 238 (FIG. 18) in film pack 22 for easy withdrawal of a negative 24 and positive sheet by the thumb and forefinger (not shown).

Since each of the nine exposure areas 26 includes an identifying number matching with the card 154 used to activate the camera, collating each identifying photograph 234 with its card 154 becomes a simple task. Once photograph 234 is mounted on card 154, the license area 240 may be reproduced and sent to the licensee, and the entire card 154 may be retained by the licensing authority as a master index card. Of course, the portion 242 (FIG. 16) of card 154 may be key-punched for such data as traffic violations, license suspensions, financial responsibility, by the licensing authority and stored in an information retrieval system programmed to ascertain such information from individual cards as desired.

I claim:

1. In a camera including a lens for projecting an image upon a film plate, a back support plate located rearwardly of the lens and having means defining an aperture therein, generally concentric with the principal axis of the lens, the lens being fixed stationary with respect to the back support plate, and a film plate for receiving images projected by the lens, movable on the back support plate in a plane generally parallel to the back support plate, a sequential exposure apparatus for presenting predetermined areas of the film plate for exposure including means for sequentially moving the film plate past the aperture and lens, comprising:
   a. first means for moving the film plate horizontally with respect to the aperture and lens; and
   b. second means, independently operable with respect to the first means, for moving the film plate vertically with respect to the aperture and lens; and
wherein the means for sequentially moving the film plate past the aperture and lens further comprise:
   c. means defining a film plate chamber, for mounting the film plate, secured in a light tight relationship with respect to the back support plate;
   d. a pair of parallel support rods, each passing through the film chamber, generally parallel with the plane of the back support plate;
   e. a pair of bearing members receiving the distal ends of the support rods; and
   f. track means guiding said bearing members for movement along said back support plate; and wherein each of said rods is of a length greater than that dimension of the film chamber through which each rod is journeled, said film chamber being movable along said rods; and wherein said film chamber is movable along said rods to a plurality of fixed positions defined by a plurality of first stop means in said film chamber cooperating with a plurality of second stop means in one of said rods.

2. The invention as recited in claim 1 wherein said first means for moving the film plate horizontally with respect to the aperture and lens comprise:
   a. a screw thread, formed on one of said support rods, and threaded through at least one side wall of said film chamber, said one rod being rotatably journalled through said film chamber and bearing members, and having one end extending through one of said bearing members;
   b. a lug, formed on the free distal end of said extended one end of said one rod;
   c. a control wheel, freely rotatably mounted on said extended one end of said one rod and slidable therealong, between the one bearing member and the lug; and
   d. means defining a recess in said control wheel, mating said lug, whereby said control wheel and lug may be engaged by sliding the control wheel and its recess to mate with said lug;
whereupon rotation of said control wheel causes rotation of said screw thread, thereby moving said film chamber laterally along said rods.

3. The invention as recited in claim 1 wherein said first stop means comprise a plurality of spring loaded balls and said second stop means comprise a plurality of means defining detents in the surface of said one rod, cooperating with said balls.

4. The invention as recited in claim 3 wherein said first and second stop means further comprise:
   a. an indicia bearing plate, formed on one of said rods; and
   b. means defining a window in said film chamber, adjacent said indicia bearing plate, for visually ascertaining the position of the film chamber as it moves along said support rods.

5. The invention as recited in claim 1 wherein said second means for moving the film plate vertically with respect to the aperture and lens comprise:
   a. a gear rack, formed on said back support plate, and aligned generally parallel with said bearing member track means; and
   b. a spur gear, mounted on one of said support rods, and aligned with said back support plate gear rack;
whereupon rotation of said spur gear, said bearing members will move along said track means, carrying said support rods and film chamber therewith, wherein said spur gear is freely, rotatably mounted on said one support rod, and slidable therealong to a position out of engagement with said back support plate gear rack.

6. The invention as recited in claim 1 wherein said bearing members are movable along the back support plate to a plurality of fixed, vertical positions, defined by a plurality of vertical stop means wherein said vertical stop means comprise:
   a. a block, mounted on a side of one of said bearing members,
   b. spring loaded ball means, directed toward said back plate from said block; and
   c. means defining a plurality of detents on the back plate, beneath the path of travel of said block, cooperating with said ball means to define said plurality of fixed, vertical positions.

7. The invention as recited in claim 13 wherein said vertical stop means comprise:
   a. a plurality of spring loaded balls, mounted in at least one of said track means; and
   b. a plurality of means defining detents in one of said bearing members, cooperating with said spring loaded balls to define said plurality of fixed, vertical positions.

8. The invention as recited in claim 7 wherein said vertical stop means further comprise:
   a. an indicia bearing plate, formed on one of said bearing members; and
   b. means defining a window in said track means, adjacent said indicia bearing plate, for visually ascertaining the position of the film chamber as it moves along said track means.

9. In a camera including a lens for projecting an image upon a film plate, a back support plate located rearwardly of the lens and having means defining an aperture therein, generally concentric with the principal axis of the lens, the lens being fixed stationary with respect to the back support plate, and a film plate for receiving images projected by the lens, movable on the back support plate in a plane generally parallel to the back support plate, a sequential exposure apparatus for presenting predetermined areas of the film plate for exposure including means for sequentially moving the film plate past the aperture and lens, comprising:
   a. first means for moving the film plate horizontally with respect to the aperture and lens; and
   b. second means, independently operable with respect to the first means, for moving the film plate vertically with respect to the aperture and lens; and
wherein the means for sequentially moving the film plate past the aperture and lens further comprise:
   c. means defining a film plate chamber, for mounting the film plate, secured in a light tight relationship with respect to the back support plate;
   d. a pair of parallel support rods, each passing through the film chamber, generally parallel with the plane of the back support plate;
   e. a pair of bearing members receiving the distal ends of the support rods; and
   f. track means guiding said bearing members for movement along said back support plate; and
wherein said camera is equipped with a shutter for opening the lens, and further comprises a secondary, simultaneous exposure system which includes:
   a. a narrow well for receiving an item to be photographed;
   b. a light source for said well, actuated by tripping said camera shutter;
   c. a periscope, including a central lens, for transmitting an image of an item in the well to said aperture; and
   d. means defining a secondary aperture, adjacent said camera aperture, for transmitting the periscope image to the film plate.

10. The invention as recited in claim 9 wherein said camera further comprises:
   a. a light source;
   b. a lens for condensing light from the light source into a pencil beam; and
   c. mirror and additional lens means for transmitting the pencil beam to a subject to be photographed;
whereupon direction of the pencil light beam on a subject to be photographed causes said camera lens to be properly aligned for photographing the subject.

11. The invention as recited in claim 9 wherein said camera further includes:
   a. means for illuminating the subject to be photographed; and
   b. means for simultaneously actuating said well light source, subject illuminating means, and camera shutter, comprising:
      2. a source of electrical current;
      2. a solenoid, having a core;
      3. trip means, secured to the core, for mechanically actuating said well light source, subject illuminating means, and camera shutter upon movement of the core;
      4. electrical circuit means for energizing said solenoid, connected to the source of electrical current; and
      5. normally open, circuit closing means for completing said electrical circuit to energize said solenoid.

12. The invention as recited in claim 11 wherein said narrow item well includes a master switch interposed in said electrical circuit means closed by the presence of an item in the well.

13. The invention as recited in claim 11 wherein said electrical circuit means further comprises electrical relay means for interrupting said electrical circuit means, actuated by said circuit closing means, and including secondary electrical circuit means for continuing energization of said relay means while said circuit closing means are closed.

* * * * *